US008693456B2

(12) United States Patent
Liu

(10) Patent No.: US 8,693,456 B2
(45) Date of Patent: Apr. 8, 2014

(54) METHOD, SYSTEM, AND DEVICE FOR RADIO NETWORK AGGREGATION

(71) Applicant: Huawei Technologies Co., Ltd., Guangdong (CN)

(72) Inventor: Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/731,132

(22) Filed: Dec. 31, 2012

(65) Prior Publication Data

US 2013/0121282 A1 May 16, 2013

Related U.S. Application Data

(63) Continuation of application No. PCT/CN2011/081681, filed on Nov. 2, 2011.

(30) Foreign Application Priority Data

Apr. 13, 2011 (CN) .......................... 2011 1 0092172

(51) Int. Cl.
*H04W 4/00* (2009.01)
*H04L 12/28* (2006.01)
(52) U.S. Cl.
USPC .......................................... 370/338; 370/401
(58) Field of Classification Search
None
See application file for complete search history.

(56) References Cited

U.S. PATENT DOCUMENTS

| 2004/0203736 | A1* | 10/2004 | Serna ......................... 455/426.1 |
| 2006/0126532 | A1* | 6/2006 | Binding et al. ............... 370/254 |
| 2006/0234638 | A1* | 10/2006 | Mueckenheim et al. .. 455/67.11 |
| 2010/0091653 | A1  | 4/2010  | Koodli et al. |
| 2011/0122845 | A1* | 5/2011  | Meirosu et al. ............... 370/332 |
| 2011/0310906 | A1  | 12/2011 | Stenfelt et al. |
| 2012/0170548 | A1* | 7/2012  | Rajagopalan et al. ........ 370/331 |
| 2012/0189016 | A1* | 7/2012  | Bakker et al. ................. 370/401 |

FOREIGN PATENT DOCUMENTS

| CN | 101616167 A | 12/2009 |
| CN | 101616398 A | 12/2009 |
| CN | 101626596 A | 1/2010 |
| EP | 2394403 A1 | 12/2011 |
| WO | 2010045302 A1 | 4/2010 |
| WO | 2010088967 A1 | 8/2010 |

OTHER PUBLICATIONS

Rodriguez, et al., "MAR: A Commuter Router Infrastructure for the Mobile Internet," Proceedings of the 2nd International Conference on Mobile Systems, Applications, and Services, Boston, Massachusetts, Jun. 2004, 14 pages.

(Continued)

*Primary Examiner* — Eunsook Choi
(74) *Attorney, Agent, or Firm* — Conley Rose, P.C.; Grant Rodolph; Nicholas K. Beaulieu

(57) ABSTRACT

A method, system, and device for radio network aggregation are applied in communication technologies. The method for radio network aggregation transmission includes: obtaining location information of a user equipment on at least two radio networks; obtaining, according to the location information, network load information of each radio network where the user equipment is currently located; determining, according to the network load information and a preset policy, a way in which data streams of the user equipment are transmitted by using the at least two radio access technologies; and transmitting the data streams of the user equipment in the determined way. Thereby, radio network aggregation is implemented.

14 Claims, 11 Drawing Sheets

(56) References Cited

OTHER PUBLICATIONS

Foreign Communication From a Counterpart Application, PCT Application PCT/CN2011/081681, Partial English Translation of Written Opinion dated Feb. 9, 2012, 7 pages.

Foreign communication from a counterpart application, PCT application PCT/CN2011/081681, English Translation International Search Report dated Feb. 9, 2012, 3 pages.
Foreign Communication From a Counterpart Application, European Application No. 11863458.3, Extended European Search Report dated Aug. 14, 2013, 7 pages.

* cited by examiner

METHOD, SYSTEM, AND DEVICE FOR RADIO NETWORK AGGREGATION

CROSS-REFERENCE TO RELATED APPLICATIONS

This application is a continuation of International Application No. PCT/CN2011/081681, filed on Nov. 2, 2011, which claims priority to Chinese Patent Application No. 201110092172.2, filed on Apr. 13, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a method, system, and device for radio network aggregation.

BACKGROUND

In the development process of mobile communication networks, due to constraints of various conditions, emerging broadband mobile communication networks and conventional networks will coexist for a long time. For example, when a Universal Mobile Telecommunications System (UMTS) network launched by the 3rd Generation Partnership Project (3GPP) organization develops towards a Long Term Evolution (LTE) network, the UMTS network and the LTE network will coexist for a long time.

A mobile communication network consists of a radio access network (RAN) and a core network (CN). A user equipment (UE) accesses the core network through the radio access network via an air interface. The air interface is closely related to a radio access technology (RAT) used by the mobile communication network. For better description, the mobile communication network corresponding to the radio access technology is hereinafter referred to as a radio network. The UMTS and the LTE are two different radio access technologies, and radio networks corresponding to the UMTS and the LTE are referred to as a UMTS network and an LTE network respectively. A transmission channel that the user equipment establishes on a radio network is referred to as a radio access. One transmission channel is a bearer of the radio access technology, for example, the bearers on the UMTS network and the LTE network are referred to as UMTS bearers and LTE bearers respectively.

In the process of evolution from the UMTS network to the LTE network, the number of users and data traffic on the LTE network increase gradually on the LTE network, while the average user rate is reduced. However, as the number of users and data traffic on the UMTS network are gradually reduced, the spectrum utilization of the UMTS network is reduced. Therefore, in a process of relocation from the UMTS network to the LTE network, spectrum resources on the UMTS network need to be effectively utilized to prevent a decline in the user experience due to overload of the LTE network spectrum in the middle to late period of the relocation.

To prevent the occurrence of the foregoing problems, a method for radio network aggregation transmission is used, that is, multiple radio accesses of one user equipment are aggregated, which ensures that original UMTS resources can be fully utilized and prevents problems such as co-channel interference and adjacent-channel interference between network systems. A method for radio network aggregation includes: introducing a mobile access router (MAR) at a user side, where the mobile access router aggregates different radio access technology links at the user side, for example, UMTS and wireless local area network (WLAN) radio links, and serves to allocate Internet Protocol (IP) packets to each radio link in an uplink direction and provide each terminal user with a data access through a local area network; and introducing a MAR server proxy device at the network side, where the MAR server proxy serves to allocate IP packets to each radio link in a downlink direction.

However, in this solution to radio network aggregation, such function entities as the MAR router and server proxy need to be introduced, which increases system complexity and costs. Another method for radio network aggregation proposed by the 3GPP organization can simplify the structure of the network system. Specifically, at least one routing filter is configured on the user equipment and a Packet Data Network (PDN) gateway respectively, where the configured routing filter includes such features as source/destination IP address, source/destination port number, and protocol type, and is used to match IP packet streams of the same features; the user equipment configures the IP addresses corresponding to each radio access (including a non-3GPP radio access and a 3GPP radio access) as different care-of addresses (CoAs); each radio access passes through the PDN gateway, where each routing filter on the PDN gateway corresponds to a care-of address. In this way, in the downlink direction, the PDN gateway routes IP packet streams matched by the routing filter to a radio network corresponding to the care-of address; similarly, in the uplink direction, the routing filter of the user equipment performs offloading control on the IP packet streams.

The method for radio network aggregation proposed by the 3GPP organization is applicable to the aggregation of non-3GPP and 3GPP radio accesses. In addition, in the process of radio network aggregation, the radio accesses in the uplink and downlink directions are fixed. Therefore, resources of each radio network cannot be utilized properly.

SUMMARY

Embodiments of the present invention provide a method, system, and device for radio network aggregation to effectively utilize resources of each radio network on an aggregated network.

An embodiment of the present invention provides a method for radio network aggregation transmission, including: obtaining location information of a user equipment on at least two radio networks; obtaining, according to the location information, network load information of each radio network where the user equipment is currently located; determining, according to the network load information and a preset policy, a way in which data streams of the user equipment are transmitted by using at least two radio access technologies; and transmitting the data streams of the user equipment in the determined way.

An embodiment of the present invention provides a method for network aggregation transmission, including: detecting a way in which data streams of a user equipment are transmitted by using at least two radio access technologies in a downlink direction, where the way in which the data streams of the user equipment are transmitted by using the at least two radio access technologies in the downlink direction is determined by a Packet Data Network gateway (PDN-GW) according to network load information of at least two radio networks where the user equipment is currently located; determining, according to the detected way, a way in which data streams of the user equipment are transmitted by using the at least two radio access technologies in an uplink direction; and transmitting uplink data streams of the user equipment from a corresponding radio network to a packet core network in the determined way.

An embodiment of the present invention provides a gateway device, including: a location obtaining unit configured to obtain location information of a user equipment on at least two radio networks; a load obtaining unit configured to obtain, according to the location information obtained by the location obtaining unit network load information of each radio network where the user equipment is currently located; a determining unit configured to determine, according to the network load information obtained by the load obtaining unit and a preset policy, a way in which data streams of the user equipment are transmitted by using the at least two radio access technologies; and a data transmitting unit configured to transmit the data streams of the user equipment according to the way determined by the determining unit.

An embodiment of the present invention provides a user equipment, including: a downlink detecting unit configured to detect a way in which data streams of the user equipment are transmitted by using at least two radio access technologies in a downlink direction, where the way in which the data streams of the user equipment are transmitted by using the at least two radio access technologies in the downlink direction is determined by a PDN gateway according to network load information of at least two radio networks where the user equipment is currently located; an uplink information determining unit configured to determine, according to the way detected by the downlink detecting unit, a way in which data streams of the user equipment are transmitted by using the at least two radio access technologies in an uplink direction; and a data access unit configured to transmit uplink data streams of the user equipment from a corresponding radio network to a packet core network according to the way determined by the uplink information determining unit.

An embodiment of the present invention provides a system for network aggregation transmission, including a user equipment and a PDN gateway device, where the user equipment includes: a downlink detecting unit configured to detect a way in which data streams of the user equipment are transmitted by using at least two radio access technologies in a downlink direction, where the way in which the data streams of the user equipment are transmitted by using the at least two radio access technologies in the downlink direction is determined by the PDN gateway according to network load information of at least two radio networks where the user equipment is currently located; an uplink information determining unit configured to determine, according to the way detected by the downlink detecting unit, a way in which data streams of the user equipment are transmitted by using the at least two radio access technologies in an uplink direction; and a data access unit configured to transmit uplink data streams of the user equipment from a corresponding radio network to a packet core network according to the way determined by the uplink information determining unit; and the PDN gateway device is configured to determine, according to the network load information of the at least two radio networks where the user equipment is currently located, the way in which the data streams of the user equipment are transmitted by using the at least two radio access technologies in the downlink direction.

In the network aggregation transmission in embodiments of the present invention, the PDN gateway obtains network load information of each radio network where the user equipment is currently located according to the location information of the user equipment on at least two radio networks, and determines, according to the network load information and a preset policy, a way in which data streams of the user equipment are transmitted by using the at least two radio access technologies, and finally transmits the data streams of the user equipment in the determined way. In this way, the data volume of streams transmitted by using each radio access technology is allocated properly on an aggregated network according to the actual load conditions of the network, so that the resources of each radio network on the aggregated network are effectively utilized.

BRIEF DESCRIPTION OF THE DRAWINGS

To make the technical solutions in embodiments of the present invention clearer, the accompanying drawings for illustrating the embodiments of the present invention or the prior art are briefly described below. Apparently, the accompanying drawings illustrate only some exemplary embodiments of the present invention, and persons of ordinary skill in the art can derive other drawings from such accompanying drawings without creative efforts.

DETAILED DESCRIPTION

The technical solutions provided in embodiments of the present invention are hereinafter described clearly and completely with reference to the accompanying drawings. Apparently, the embodiments described below are exemplary only, without covering all embodiments of the present invention. All other embodiments that persons of ordinary skill in the art obtain based on embodiments of the present invention without creative efforts also fall within the scope of the present invention.

Method Embodiment 1

Figure 1:
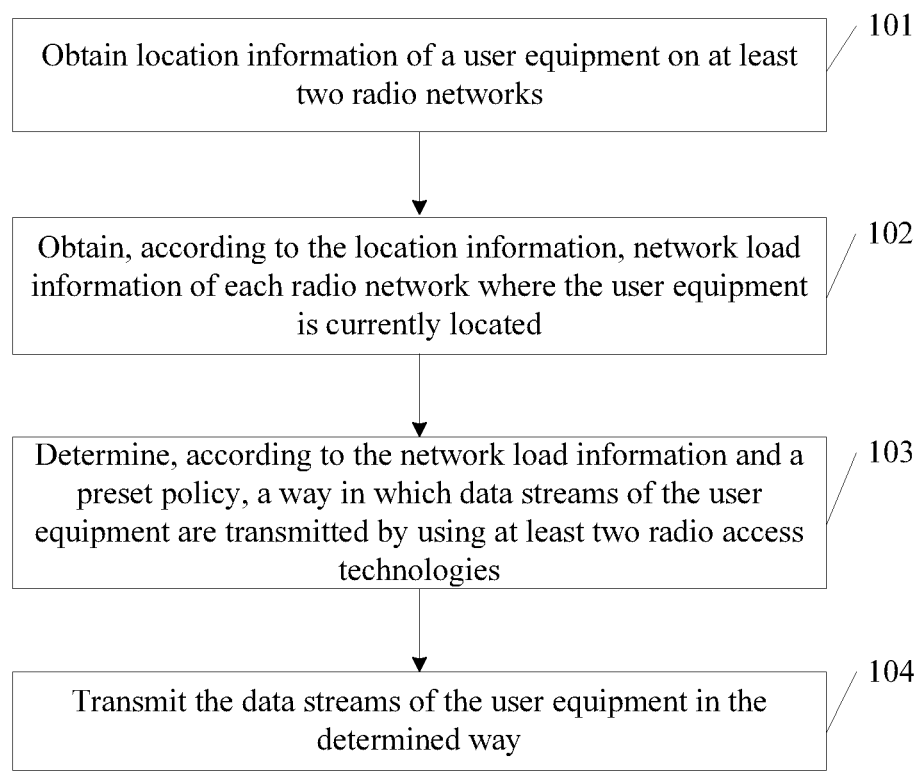
FIG. 1 is a flowchart of a method for radio network aggregation transmission according to an embodiment of the present invention.

A method for radio network aggregation transmission is used to aggregate different radio access using a uniform packet core network, for example, aggregating the UMTS access and LTE radio access. In addition, a user equipment may access the packet core network through at least two different radio interfaces. The method provided in this embodiment is executed by a gateway between a uniform packet core network and an external packet network, that is, a PDN gateway. As shown in FIG. 1, the method includes the following steps:

Step 101: Obtain location information of a user equipment on at least two radio networks.

In this embodiment, the user equipment accesses the packet core network through at least two radio interfaces, that is, bearers of at least two radio access technologies are established between the user equipment and the PDN gateway. The location information can indicate a current location of the user equipment on a radio network, and the location information may be identifier information of a current cell of the user equipment, identifier information of a routing area where the user equipment is located, identifier information of a tracking area where the user equipment is located, or other information.

In the processes that the user equipment attaches to a radio network, and establishes, modifies or deletes radio network bearers, an access service network gateway sends the current location information of the user equipment to the PDN gateway, where the access service network gateway is a serving network node through which the user equipment accesses the packet core network, for example, an SGSN on a UMTS network, a Mobility Management Entity (MME) on an LTE network, and a Serving Gateway (S-GW). Therefore, the PDN gateway may obtain the location information of the user equipment from the access service network gateway.

Step 102: Obtain, according to the location information, network load information of each radio network where the user equipment is currently located.

The network load information of a radio network where the user equipment is currently located may be information such as the number of active users, network load rate, and data throughput or data transmission rate of the radio network where the user equipment is currently located.

In a mobile communication system, an operation support system (OSS) is a comprehensive service operation and management platform. Network related information is stored in the OSS system, including state information such as network load information. The PDN gateway may query the OSS system for load information of a corresponding area network indicated by the location information of the user equipment.

Step 103: Determine, according to the network load information and a preset policy, a way in which data streams of the user equipment are transmitted by using at least two radio access technologies.

The preset policy may include one or multiple pieces of the following information: The traffic scaling factor between a first radio network and a second radio network is a preset value; a same data stream is transmitted by using a same radio access technology in uplink and downlink directions, for example, uplink and downlink data of a same Transmission Control Protocol (TCP) connection is transmitted by using a same radio access technology; the number of network users in a corresponding area of the first radio network is smaller than a preset value; the uplink data streams of the user equipment are transmitted preferably by using a second radio access technology, and when the data transmission rate of the second radio network is smaller than a preset value, downlink data streams are transmitted by using a first radio access technology.

It is understandable that the PDN gateway may consider only the actual load on a network to determine a way in which data streams are transmitted by using a radio access technology, which enables that requirements in the preset policy can be met after the data streams of the user equipment are transmitted by using a bearer of a corresponding radio access technology, so that load balancing between each radio network is implemented.

The PDN gateway may consider not only the actual network load but also application layer data stream information of the user equipment, that is, the PDN gateway may consider other information such as data transmission based on actual requirements of the user equipment, to determine a way in which data streams are transmitted by using a radio access technology, which enables that not only the requirements in the preset policy but also the actual requirements of the user equipment can be met after data streams of the user equipment are transmitted by using the bearer of a corresponding radio access technology. In this way, load balancing between each radio network can be implemented, and quality of service requirements of the user equipment can be met.

The way in which the data streams of the user equipment are transmitted by using at least two radio access technologies that is determined by the PDN gateway may include: which radio access technology and which bearer of the radio access technology are used to transmit each uplink data stream and each downlink data stream of the user equipment.

The application layer data stream information of the user equipment refers to information such as the maximum allowable transmission rate, a total data volume, and the maximum allowable delay of uplink and downlink data streams to be transmitted. The user equipment may obtain the application layer data stream information through an application layer message during the creation of a session, for example, it obtains the application layer data stream information through a Session Initiation Protocol (SIP) message, a File Transfer Protocol (FTP), and a Hypertext Transfer Protocol (HTTP) message; the PDN gateway may obtain the application layer data stream information of the user equipment by querying a policy and charging rules function (PCRF) entity or by using a built-in deep packet inspection (DPI) function of the PDP gateway.

Step 104: Transmit the data streams of the user equipment in the determined way.

It should be noted that the PDN gateway may configure a bearer of each radio access technology in the uplink and/or downlink direction for the user equipment according to the determined way in which data streams are transmitted by using each radio access technology, that is, which radio access technology and which bearer of the radio access technology are used to transmit each uplink data stream and/or each downlink data stream of the user equipment. In this way, in the downlink direction, the PDN gateway transmits the downlink data streams of the user equipment according to a configured bearer of a radio access technology in the downlink direction; in the uplink direction, the user equipment transmits the uplink data streams of the user equipment according to the configured bearer of the radio access technology in the uplink direction.

As known above, in the radio network aggregation in this embodiment of the present invention, the PDN gateway obtains network load information of each radio network where the user equipment is currently located according to the location information of the user equipment on at least two radio networks, and determines, according to the network load information and a preset policy, a way in which data streams of the user equipment are transmitted by using the at least two radio access technologies, and finally transmits the data streams of the user equipment in the determined way. Therefore, the data volume transmitted by using each radio access technology is allocated properly on an aggregated network according to the actual load conditions of the network, so that the resources of each radio network on the aggregated network are effectively utilized.

The method for radio network aggregation transmission in this embodiment of the present invention is a transmission method in which the user equipment accesses the packet core network through at least two radio interfaces. In a specific embodiment, before step 101, the PDN gateway further executes the following step:

Establish bearers of at least two radio access technologies with the user equipment, and store identifier information of the user equipment and identifier information of the bearers of the at least two radio access technologies.

The established bearers of the radio access technologies refer to data transmission channels based on the radio access technologies, which are established between the user equipment and the packet core network after the user equipment attaches to the radio network. Specifically, the bearers may be established by using any one or multiple of the following ways: The user equipment establishes one PDN connection of bearers of multiple radio access technologies through the PDN gateway, that is, the user equipment establishes, through the PDN gateway, one PDN connection that adopts bearers of multiple radio access technologies; the user equipment establishes bearers of different radio access technologies with multiple PDN connections, that is, one part of the PDN connections established by the user equipment through a PDN gateway adopts the bearers of one radio access technology, while the other part of the PDN connections established by the user equipment through the PDN gateway adopts the bearers of another radio access technology.

It should be noted that in the process of establishing bearers in this embodiment, when a PDN connection is established, bearers of multiple radio access technologies established by the same user equipment use a same PDN address, that is, a same IP address, which prevents the waste of address resources.

After the bearers are established, the PDN gateway may control, in a semi-static way and/or dynamic way, the allocation of data streams to be transmitted by adopting each radio access technology. Details are as follows:

(1) Data streams are controlled in a semi-static way: When the data streams are controlled, the PDN gateway differentiates, through a traffic flow template (TFT) and/or a PDN connection, bearers of each radio access technology established between the user equipment and the PDN gateway.

In this embodiment, PDN connections may be used to differentiate the bearers of different radio access technologies. Specifically, when the user equipment establishes multiple PDN connections through the PDN gateway, the following may be configured: the user equipment adopts different radio access technologies for different PDN connections, for example, the user equipment establishes five PDN connections through the PDN gateway, where three PDN connections of the user equipment adopt a radio access technology A, while the other two PDN connections of the user equipment adopt a radio access technology B.

The bearers of different radio access technologies may be differentiated through traffic flow templates. To differentiate data streams transmitted over bearers from application layer data packets, each bearer corresponds to one TFT. A TFT is a group of packet filters, where each packet filter may include such features as a source/destination IP address, a protocol type, and a port range and is used to match and separate data streams with the same features. Specifically, when the same PDN connection that the user equipment establishes through the PDN gateway has multiple data streams, the following may be configured: different data streams in the PDN connection between the user equipment and the PDN are transmitted by using different radio access technologies. Because these data streams correspond to different TFTs, they can be differentiated from the application layer data packets, and transmitted through the bearers of corresponding radio access technologies.

No matter whether the bearers of different radio access technologies are differentiated through PDN connections or through TFTs, the PDN gateway may control, in a semi-static way, the transmission of data streams through each radio access technology when step 103 is executed. Specifically, this may be implemented through the following step A1 or step B1:

Step A1: Determine, only according to the network load information obtained in step 102 and a preset policy, a traffic flow template TFT and a radio access technology that correspond to a bearer used to transmit the data streams of the user equipment in the uplink direction and/or the downlink direction.

In the bearer establishment process, the user equipment carries an identifier of a radio access technology corresponding to the bearer in a bearer request. Therefore, the PDN gateway knows the radio access technology corresponding to the bearer established between the PDN gateway and the user equipment, and the user equipment also knows the radio access technology corresponding to the established bearer.

In this case, the PDN gateway may, according to the actual network load and the preset policy, determine a way in which uplink and/or downlink data streams are transmitted by using a radio access technology. In this way, after the data streams of the user equipment are transmitted by using the bearer of a corresponding radio access technology, requirements in the preset policy can be met, and load balancing between each radio network can be implemented. The preset policy is described in step 103 and is not further described.

The data stream transmission way determined by the PDN gateway may include: data streams transmitted in the uplink and downlink directions, where each data stream corresponds to one TFT; and bearers of radio access technologies used to transmit data streams.

Step B1: Determine, according to the network load information, service layer data stream information of the user equipment, and the preset policy, a traffic flow template and a radio access technology that correspond to a bearer used to transmit the data streams of the user equipment in the uplink direction and/or the downlink direction.

It is understandable that when the way in which data streams of the user equipment in the uplink and/downlink direction are transmitted is determined, the way in which data streams are transmitted may be determined according to the actual load information in a current network and data transmission based requirements of the user equipment. In this way, after the data streams of the user equipment are transmitted through a bearer of a corresponding radio access technology, not only the requirements in the preset policy can be met, but also the actual requirements of the user equipment can be met. Therefore, load balancing between each radio network can be implemented, and quality of service requirements of the user equipment can be met. The preset policy is described in step 103 and is not further described.

The data stream transmission way determined by the PDN gateway may include: data streams transmitted in the uplink and downlink directions, where each data stream corresponds to one TFT; and bearers of radio access technologies used to transmit data streams.

After the way in which data streams are transmitted is determined in a semi-static way, when the data stream transmission in step 104 is executed, in the downlink direction, the PDN gateway transmits the downlink data streams of the user equipment according to a configured bearer of a radio access technology in the downlink direction; in the uplink direction, the user equipment transmits the uplink data streams of the user equipment according to the configured bearer of the radio access technology in the uplink direction.

It should be noted that when the data streams are controlled in a semi-static way, a bearer of a same radio access technology should be used to transmit a same data stream, that is, an uplink or downlink data stream of a same TCP connection. This prevents TCP performance loss caused by great differences between transmission delays when a same data stream is transmitted by using different radio access technologies.

(2) The data streams are controlled in a dynamic way: In a dynamic way, bearers of different radio access technologies corresponding to a same PDN connection that the user equipment establishes through the PDN gateway may adopt a same TFT.

To control data streams in a dynamic way, the PDN gateway determines only the way in which data streams are transmitted in the downlink direction, while the way in which data streams are transmitted in the uplink direction is determined by the user equipment (described in the following Embodiment 2). In this case, when determining the way in which data streams of the user equipment are transmitted by using at least two radio access technologies in the downlink direction, the PDN gateway may determine a data volume or a data volume proportion of data streams transmitted by using a bearer of each radio access technology in the downlink direction. Step 104 may be implemented by the following steps:

Step A2: Select, according to the determined data volume or data volume proportion, a radio access technology used to transmit the data streams of the user equipment in the downlink direction.

Step B2: Transmit the data streams of the user equipment in the downlink direction by using the bearer of the selected radio access technology.

It is understandable that when the PDN gateway selects a radio access technology, the data volume or data volume proportion of streams transmitted by using each radio access technology in the downlink direction should comply with the data volume or data volume proportion that the PDN gateway determines according to the network load information.

Figure 2:
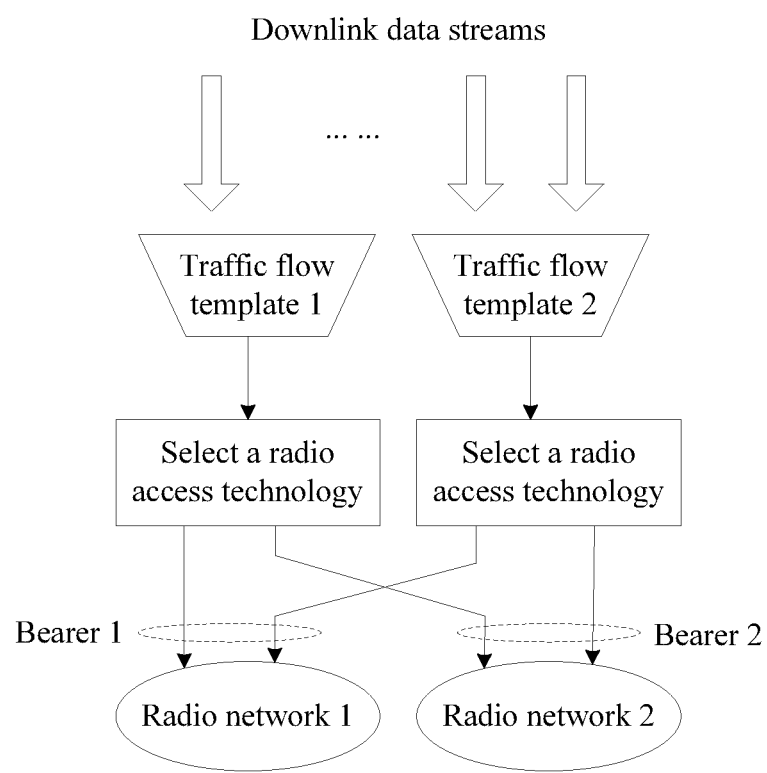
FIG. 2 is a schematic diagram of controlling data streams in a dynamic way according to an embodiment of the present invention.

As shown in FIG. 2, a TFT1 on the PDN gateway matches and separates downlink data streams of a user equipment 1, while a TFT2 matches and separates downlink data streams of a user equipment 2. After the data volume of streams transmitted by using a radio access technology 1 and/or 2 in the downlink direction is determined in a dynamic way, a radio access technology selection function entity selects, according to the determined data volume of streams transmitted in the downlink direction, a radio access technology that is used to transmit the downlink data streams, and transmits the downlink data streams of the user equipment by using the bearer of the selected radio access technology 1 and/or 2.

It should be noted that when the data streams are controlled in a dynamic way, bearers of different radio access technologies may be used to transmit a same data stream, that is, an uplink or downlink data stream of a same TCP connection. In this way, the traffic of the user equipment on different radio access networks may be controlled dynamically and flexibly.

Because bearers of different radio access technologies in a dynamic way may use a same TFT, the PDN gateway may configure a same TFT for the bearers of multiple different radio access technologies, so that the bearers can carry data streams with the same Quality of Service (QoS) requirements. This prevents TCP performance loss caused by great differences between transmission delays when bearers of different radio access technologies are used to transmit a same data stream, that is, an uplink or downlink data stream of a same TCP connection.

In this embodiment of the present invention, the user equipment accesses the packet core network through at least two radio interfaces. In this case, the user equipment is in a network aggregation transmission state; the user equipment may exit a radio network and access the packet core network only through one radio interface. At this time, the user equipment is in a single network transmission state.

In another specific embodiment, the user equipment may switch between the single network transmission state and the network aggregation transmission state. Details are as follows:

(1) Assuming that the user equipment is currently located on a first radio network, the user equipment may switch from the single network transmission state to the network aggregation transmission state in the following cases, that is, the user equipment attaches to a radio network other than the first radio network, for example, a second radio network.

a1. The user equipment automatically enables a function of network aggregation transmission.

b1. The user equipment does not disable the function of network aggregation transmission; the user equipment carries data streams by using only a radio access technology 1 due to factors such as the network coverage; the user equipment reenters the coverage area of other radio networks.

c1. The user equipment does not disable the function of network aggregation transmission; the user equipment exits a radio network 1 due to the network overload of the radio network 1 (or other factors); the user equipment needs to re-establish the bearer of the radio network 1 when the cause for exiting the user equipment from the radio network 1 is eliminated.

In the cases a1 and b1, the user equipment directly initiates an attach request to the second radio network. After the packet core network receives the attach request, it establishes a bearer of a second radio access technology between the PDN gateway and the user equipment. In the case c1, the PDN gateway is required to detect the actual condition of the second radio network, for example, detect whether the network load of the second radio network is within a preset range; if so, the PDN gateway establishes a bearer of the second radio access technology with the user equipment.

(2) The user equipment may switch from the network aggregation transmission state to the single network transmission state in the following cases:

a1. The user equipment automatically disables the function of network aggregation transmission.

b2. The user equipment leaves the coverage area of any one radio network due to the movement of the user equipment.

c2. The user equipment cannot communicate through a radio network due to factors, such as the radio network is abnormal or the user equipment enters the dead zone of the radio network.

d2. The user equipment needs to exit a radio network due to factors, such as the network overload of the radio network where the user equipment is located.

In the case a2, the user equipment directly initiates a detach request to the any one radio network; in the case b2, if the user equipment detects that the signal strength of a radio network is smaller than a preset threshold, the user equipment initiates a detach request to the radio network; in the case c2, a radio network initiates a detach request of the user equipment to another radio network. When the PDN gateway receives the detach request, the PDN gateway deletes the bearer of the user equipment on another radio network.

In the case d2, the PDN gateway may detect whether the network load of any one radio network where the user equipment is located exceeds a preset range; if so, the PDN gateway deletes the bearer of the radio network.

Method Embodiment 2

Figure 3:
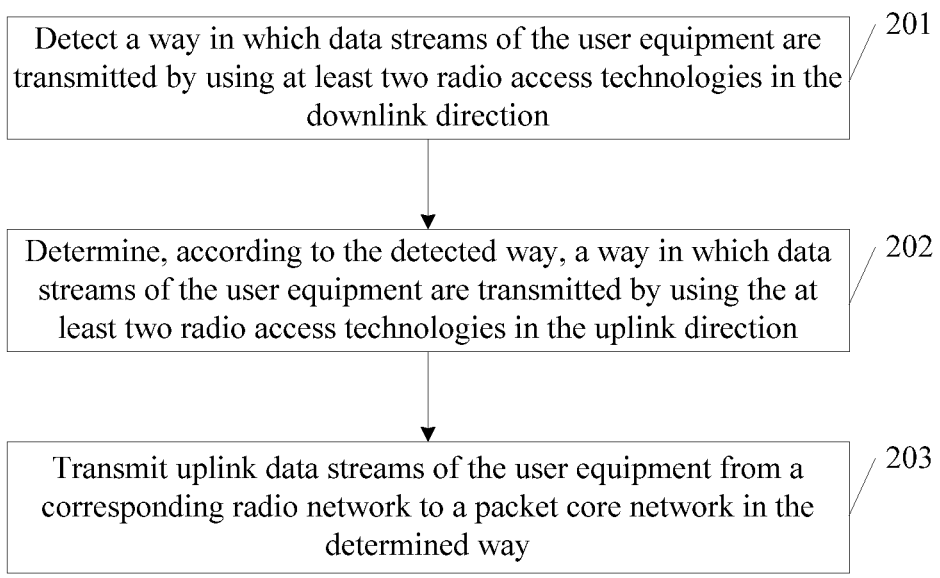
FIG. 3 is a flowchart of another method for radio network aggregation transmission according to a second embodiment of the present invention.

A method for radio network aggregation transmission is used to aggregate different radio networks using a uniform packet core network, for example, UMTS and LTE radio networks. In addition, a user equipment may access the packet core network through at least two different radio interfaces. The method provided in this embodiment is executed by the user equipment. As shown in FIG. 3, the method includes the following steps:

Step 201: Detect a way in which data streams of the user equipment are transmitted by using at least two radio access technologies in the downlink direction.

It is understandable that a dynamic way is used to control the transmission of uplink data streams by using different radio access technologies. Because the user equipment cannot obtain related network load conditions, when the user equipment performs dynamic traffic control on the uplink data streams, a reverse synchronization method may be used, that is, the way in which data streams are transmitted by using at least two radio access technologies in the downlink direction is detected, for example, bearers of radio access technologies used for the downlink data streams received by the user equipment.

The way in which data streams of the user equipment are transmitted by using at least two radio access technologies in the downlink direction is determined by the PDN gateway in a dynamic way and according to the network load information of at least two radio networks where the user equipment is currently located. A specific determining method is as described in Embodiment 1 and is not further described.

Step 202: Determine, according to the detected way, a way in which data streams of the user equipment are transmitted by using the at least two radio access technologies in the uplink direction.

When the way in which data streams are transmitted in the uplink direction is determined, the user equipment may determine, according to a volume proportion of data carried by using at least two radio access technologies in the downlink direction or according to a preset calculation relationship, a way in which data streams of the user equipment are transmitted in the uplink direction. For example, the data volume proportion carried by using at least two radio access technologies in the downlink direction is used as the data volume proportion carried by using at least two radio access technologies in the uplink direction; or the data volume proportion carried by using at least two radio access technologies in the uplink direction is equal to the data volume proportion carried by using a radio access technology in the downlink direction multiplied by a scaling factor, where the scaling factor may be configured inside the user equipment or dynamically configured by the network side through signaling.

It should be noted that because a high speed packet access (HSPA) technology has poor uplink transmission performance and low transmission efficiency, the user equipment does not use the HSPA to transmit user data in the uplink direction, but uses the HSPA to transmit L1, L2 or L3 control signaling, and so on, necessary for the air interface. In this way, when uplink data streams are transmitted, power consumption of the user equipment may also be reduced.

Step 203: Transmit uplink data streams of the user equipment from a corresponding radio network to a packet core network in the determined way.

As known above, in the radio network aggregation transmission in this embodiment of the present invention, the user equipment determines, according to the detected way in which data streams are transmitted by using at least two radio access technologies in the downlink direction, a way in which data streams are transmitted by using at least two radio access technologies in the uplink direction, and transmits the uplink data streams from a corresponding radio network to the packet core network in the determined way. Because the information of data streams of the user equipment in the downlink direction is allocated properly according to the actual load conditions of the network, resources of each radio network on the aggregated network are effectively utilized.

The method for radio network aggregation transmission in this embodiment of the present invention is a transmission method in which the user equipment accesses the packet core network through at least two radio interfaces. In a specific embodiment, before step 201, the user equipment further executes the following step:

Step 200: Establish bearers of at least two radio access technologies with the PDN gateway.

When the user equipment establishes bearers with the PDN gateway, it may use any one or multiple of the following ways: The user equipment establishes one PDN connection of bearers of multiple radio access technologies through the PDN gateway, that is, the user equipment establishes, through the PDN gateway, one PDN connection that adopts bearers of multiple radio access technologies; the user equipment establishes bearers of different radio access technologies with multiple PDN connections, that is, one part of the PDN connections established by the user equipment through the PDN gateway adopt the bearers of one radio access technology, while the other part of the PDN connections established by the user equipment through the PDN gateway adopt the bearers of another radio access technology.

In this embodiment, the user equipment establishes bearers of multiple radio access technologies of a same PDN connection through the PDN gateway and by using a same PDN address, that is, an IP address. In this way, waste of address resources is prevented. In addition, the user equipment establishes bearers of different radio access technologies corresponding to different PDN connections through the PDN gateway and by using different IP addresses, while the PDN gateway can know, according to the identifier information of the user equipment, bearers of which radio access technologies are established by the user equipment.

The aggregation of a UMTS network and an LTE network is described below.

On the UMTS/LTE aggregated network, there is a uniform packet core network. An LTE network system includes such network elements as a Mobility Management Entity, a Serving Gateway, a PDN gateway, and a policy and charging rules function; a UMTS network system includes such network elements as a Serving GPRS Support Node, a PCRF, and a PDN gateway.

Figure 4A:
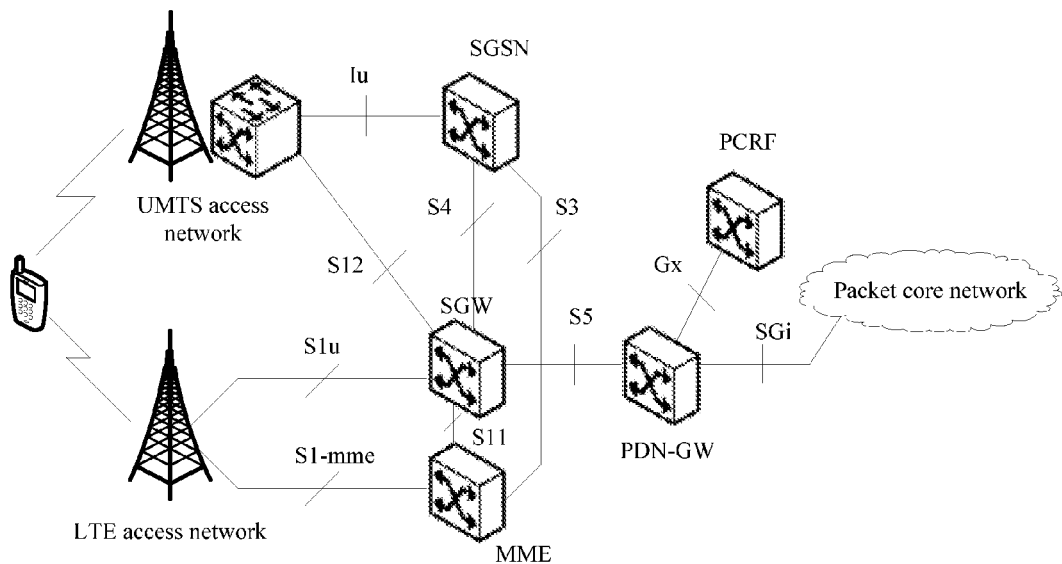
FIG. 4a is a schematic structural diagram of a UMTS/LTE aggregated network where a Serving General Packet Radio Service Support Node (SGSN) supports an S3/S4 interface according to an embodiment of the present invention.

As shown in FIG. 4a, in the case that the SGSN of the UMTS system supports an S3/S4 interface, a UMTS radio access network is connected to the SGSN through an Iu interface, while the SGSN is connected to the MME and the S-GW through an S3 interface and an S4 interface. The UMTS radio access network may also be connected directly to the S-GW through an S12 interface; the LTE radio access network is connected to the MME and the S-GW through a control plane interface S1-mme and a user plane interface S1u, respectively, and the MME and the S-GW are connected through a control plane interface S11. The S-GW is connected to the PDN gateway through an S5 interface, while the PDN gateway is connected to the packet core network through an SGi interface. Meanwhile, the PDN gateway is connected to the PCRF through a Gx interface.

Figure 4B:
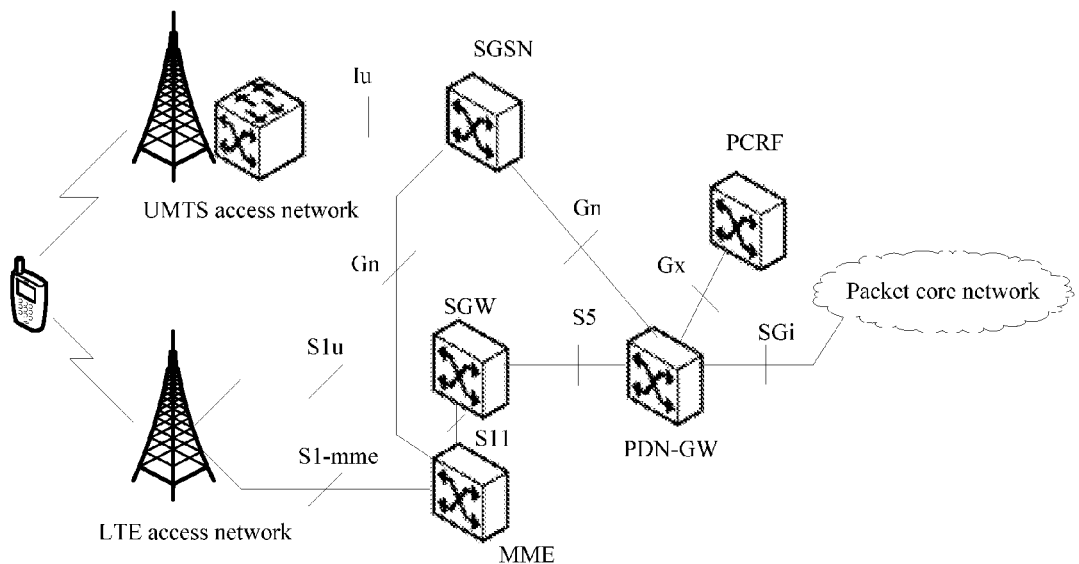
FIG. 4b is a schematic structural diagram of a UMTS/LTE aggregated network where an SGSN does not support an S3/S4 interface according to an embodiment of the present invention.

As shown in FIG. 4b, in the case that the SGSN of the UMTS system does not support the S3/S4 interface, the structure of the aggregated network is similar to that of the aggregated network where the SGSN supports the S3/S4 interface, with the following differences: In the aggregated network, the SGSN is connected to each of the MME and the PDN gateway through a Gn interface, and the UMTS radio access network cannot be connected to the S-GW directly through the S12 interface.

The method for radio network aggregation transmission in this embodiment of the present invention may be applicable to the aggregated network systems shown in FIG. 4a and FIG. 4b. In addition, in this embodiment, the user equipment has the LTE/UMTS aggregation transmission function. The network system notifies, by using a broadcast message, the user equipment of the fact that the network system supports the function of LTE/UMTS network aggregation transmission; a user may enable the LTE/UMTS aggregation transmission function of the user equipment through the broadcast message and access the network system. To save power, the LTE/UMTS aggregation transmission function of the user equipment may be disabled, that is, only the LTE network system or the UMTS network system is used to transmit data streams.

Specifically, in the case that the SGSN of the UMTS system supports the S3/S4 interface, the following steps are executed:

(1) Establish bearers of the UMTS and the LTE between the user equipment and the packet core network.

Figure 5:
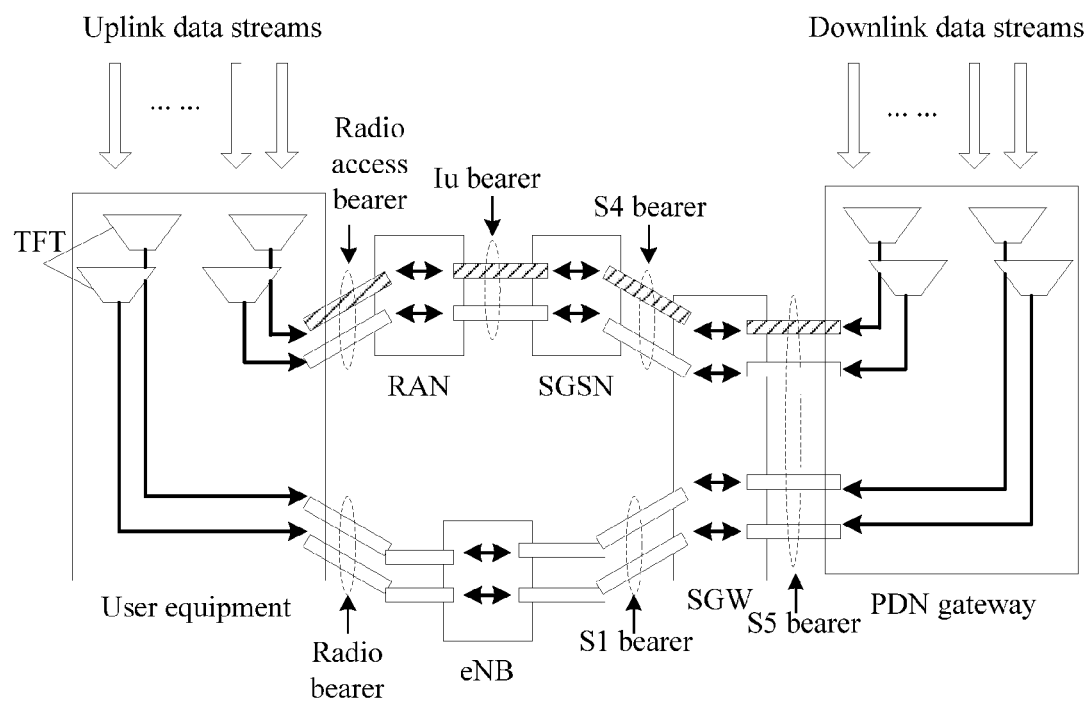
FIG. 5 is a schematic structural diagram of establishing bearers of a user equipment on a UMTS network and an LTE network according to an embodiment of the present invention.

As shown in FIG. 5, in one case, the user equipment may first access the LTE radio network and complete the network attachment to establish an LTE bearer with the PDN gateway. In this process, the network side may allocate an IP address to the user equipment. In addition, the established LTE bearer may include a default bearer or include a default bearer and at least one dedicated bearer. Specifically, the established LTE bearer includes a radio bearer (RB) between the user equipment and the evolved Node B (eNB) of the LTE radio network, an S1 bearer between the eNB and the S-GW, and an S5 bearer between the S-GW and the PDN gateway. In this way, the user equipment may send, through an uplink TFT, corresponding data streams to the packet core network by using the LTE bearer.

If the user equipment enables the LTE/UMTS network aggregation function, when the user equipment discovers that the current location is covered by the UMTS network, the user equipment may access the UMTS radio network by using the IP address that the network side previously allocates to the user equipment. After completing the network attachment, the user equipment establishes a UMTS bearer with the PDN gateway. The established UMTS bearer includes a Packet Data Protocol Context (PDP Context) between the user equipment and the SGSN or a Packet Data Protocol Context or at least one secondary Packet Data Protocol Context (Secondary PDP Context). Specifically, the established UMTS bearer includes a radio access bearer (RAB) between the user equipment and the UMTS radio network (RAN) and an Iu bearer between the UMTS radio network and the SGSN. The established UMTS bearer further includes a default bearer between the SGSN and the packet core network or includes a default bearer and at least one dedicated bearer. Specifically, the established UMTS bearer further includes an S4 bearer between the SGSN and the S-GW and an S5 bearer between the S-GW and the PDN gateway.

In another case, the user equipment may first access the UMTS radio network. After completing the network attachment, the user equipment establishes a UMTS bearer with the PDN gateway through independent bearer establishment signaling. If the user equipment enables the LTE/UMTS network aggregation function, when the user equipment discovers that the current location is covered by the LTE network, it accesses the LTE radio network and establishes an LTE bearer with the PDN gateway.

It should be noted that the user equipment may establish LTE and UMTS bearers of a same PDN connection through the PDN gateway and by using a same IP address or establish LTE and UMTS bearers of different PDN connections through the PDN gateway and by using different IP addresses. In addition, after the LTE and UMTS bearers are established, the PDN gateway may store the identifier information of the user equipment and identifier information of the LTE and UMTS bearers. In this way, the PDN gateway may know which bearers are established by the user equipment.

Figure 6:
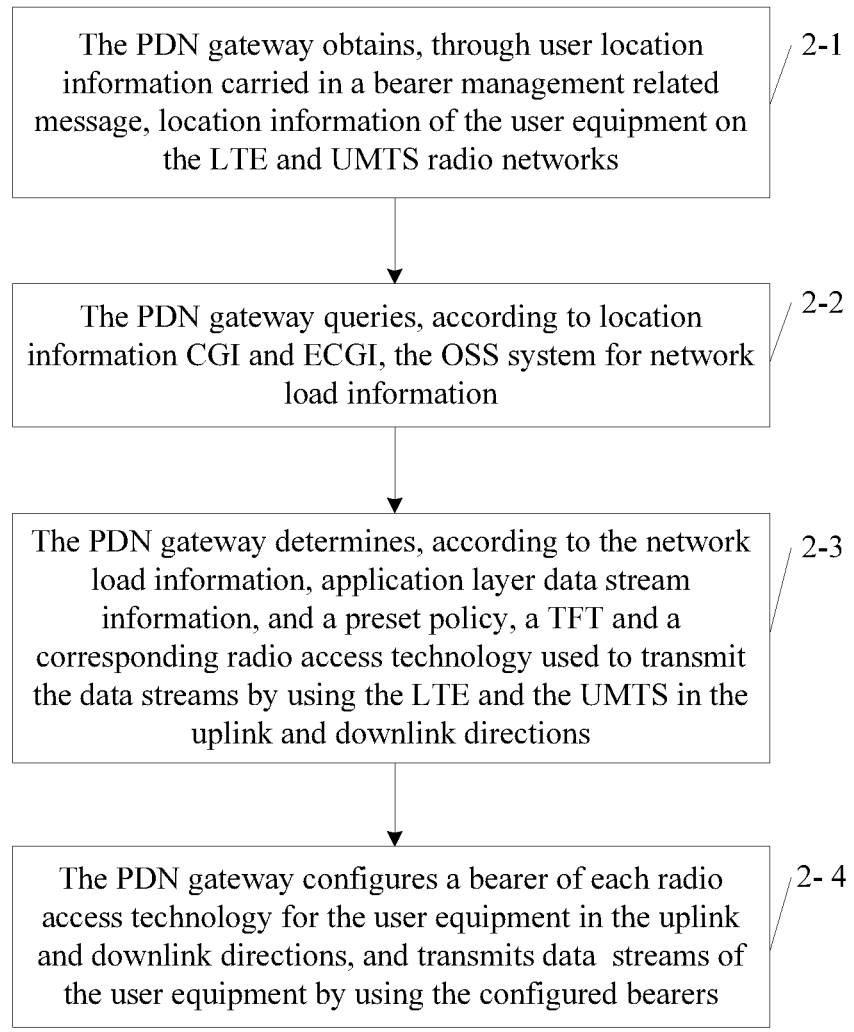
FIG. 6 is a flowchart of controlling UMTS and LTE bearers in a semi-static way to transmit data streams of a user equipment according to an embodiment of the present invention.

(2) Control the UMTS and LTE bearers in a semi-static way to transmit data streams of the user equipment. This is implemented by the following steps, as shown in FIG. 6.

Step 2-1: The PDN gateway may obtain, through user location information (ULI) carried in a bearer management related message, location information of the user equipment on the LTE and UMTS radio networks. For example, the PDN gateway may obtain the location information of the user equipment on a network from the ULI carried in a Create Session Request, a Bearer Resource Command, a Modify Bearer Request, an Update Bearer Response, a Delete Bearer Response or a Delete Session Response.

The foregoing ULI may be a cell global identifier (CGI), an evolved cell global identifier (ECGI), a routing area identifier (RAI), and a tracking area identifier (TAI), where: the CGI refers to the identifier of a UMTS cell where the user equipment is located; the ECGI refers to the identifier of an LTE cell where the user equipment is located; the RAI refers to the identifier of a routing area (RA) in a packet switched (PS) domain of the UMTS system, that is, an area corresponding to one or multiple geographic neighboring cells. When the RA of the user equipment is changed, the user equipment may initiate a routing area update (RAU) procedure to ensure that the SGSN can exactly know the location of a new routing area where the user equipment is currently located; the TAI refers to the identifier of a tracking area (TA) of the user equipment in the LTE system, that is, an area corresponding to one or multiple geographic neighboring cells. When the TA of the user equipment is changed, the user equipment may initiate a tracking area update (TAU) procedure to ensure that the MME/S-GW can exactly know the location of a new tracking area where the user equipment is currently located.

It is understandable that, the SGSN and the S-GW/MME send the ULI to the PDN gateway in the processes that the user equipment attaches to the network, and establishes, modifies and deletes LTE and UMTS bearers, including mobility management processes such as performing TAU and routing area update by the user equipment, and relocating such network nodes as the SGSN and the S-GW/MME. In the UMTS system, the SGSN provides the PDN gateway with CGI and RAI information, while in the LTE system, the S-GW/MME provides the PDN gateway with ECGI and TAI information. Therefore, the PDN gateway can always know the location information of the user equipment in the UMTS system and the LTE system.

Step 2-2: The PDN gateway queries, according to the obtained location information CGI and ECGI of the user equipment on the UMTS and LTE networks, the OSS system for network load information of the UMTS and LTE networks where the user equipment is currently located. The OSS system records such load related information as the average number of active users and average traffic within a period of time in each RA or TA.

Step 2-3: The PDN gateway, under the current QoS policy control mechanism, can obtain application layer data stream information through the PCRF, and determine, according to the network load information, the application layer data stream information, and a preset policy, a TFT and a radio access technology that correspond to a bearer used to transmit data streams of the user equipment by using the LTE and the UMTS in uplink and downlink directions respectively. In this way, the loads in the LTE and UMTS systems can be better controlled, and the utilization and throughput of these two systems can be maximized.

It is understandable that the user equipment and the PDN gateway can exactly know whether the radio access technology corresponding to each established bearer is LTE or UMTS. When data streams are determined in a semi-static way, a TFT and/or a PDN connection may be used to differentiate the bearers of different radio access technologies. Specifically, the TFT and radio access technology that correspond to a bearer used to transmit data streams by using the LTE and UMTS are determined, and uplink or downlink data streams of a same TCP connection are transmitted by using the bearer of a same radio access technology.

Step 2-4: After determining the way in which data streams are transmitted in uplink and downlink directions, the PDN gateway configures a bearer of each radio access technology for the user equipment in the uplink and downlink directions in the determined way, and transmits the data streams of the user equipment by using the configured bearers.

Figure 7:
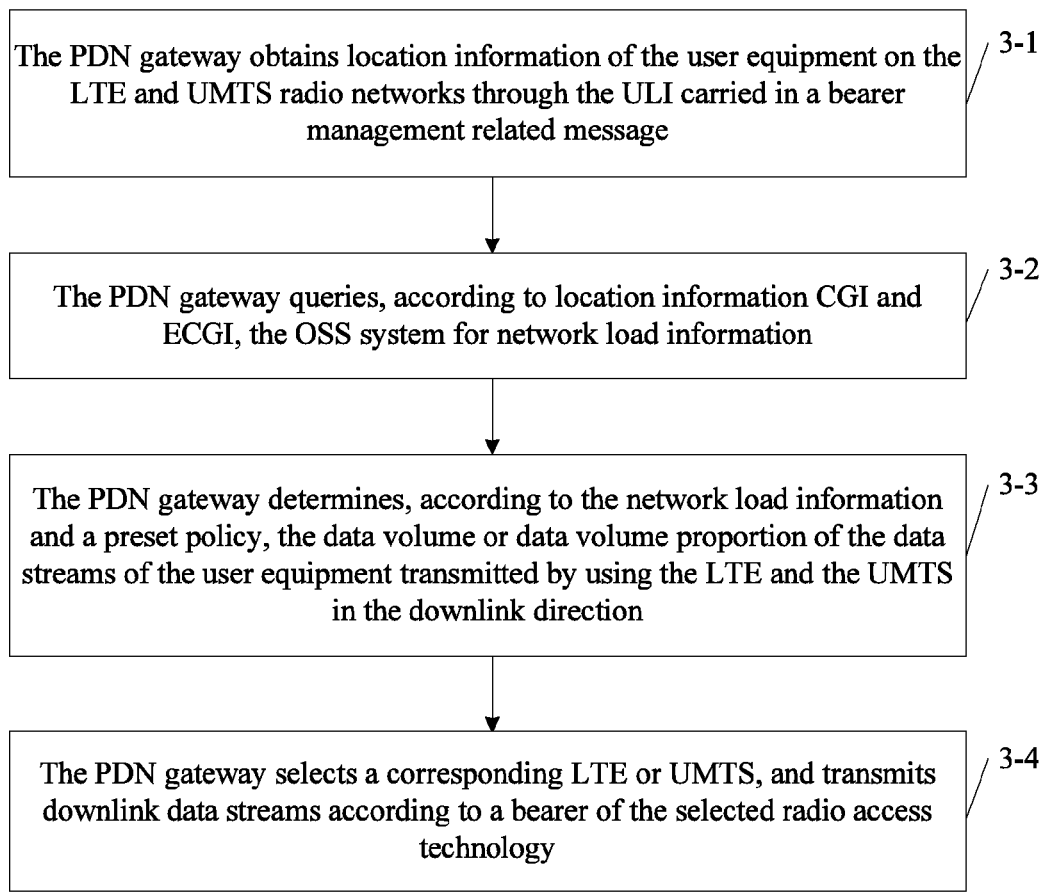
FIG. 7 is a flowchart of controlling UMTS and LTE bearers in a dynamic way to transmit data streams of a user equipment according to an embodiment of the present invention.

(3) Control the UMTS and LTE bearers in a dynamic way to transmit data streams of the user equipment. This is implemented by the following steps, as shown in FIG. 7.

Step 3-1: The PDN gateway obtains the location information of the user equipment on the LTE and UMTS radio networks through the ULI carried in bearer management related messages, for example, CGI/ECGI and RAI/TAI information.

Step 3-2: The PDN gateway queries, according to the obtained location information of the user equipment on the UMTS and LTE radio networks, the OSS system for network load information of these two networks where the user equipment is currently located.

Step 3-3: The PDN gateway determines, according to the network load information and a preset policy, a way in which the data streams of the user equipment are transmitted by using the LTE and UMTS in the downlink direction, including the data volume of the downlink data streams transmitted by using the LTE and the UMTS, for example, a specific data volume or data volume proportion. In this way, the loads in the LTE and UMTS systems can be better controlled, and the utilization and throughput of these two systems can be maximized.

Step 3-4: The PDN gateway selects, according to the determined data volume or data volume proportion of the data streams transmitted in the downlink direction, a corresponding LTE or UMTS, and transmits the downlink data streams according to the bearer of the selected LTE or the UMTS.

It is understandable that when the way in which data streams are transmitted is determined in a dynamic way, a same TFT and/or PDN connection can correspond to bearers of different radio access technologies. Specifically, different packets of a same data stream can be transmitted by using different radio access technologies, and the bearers of different radio access technologies should have the same QoS.

The way in which data streams are transmitted in the uplink direction is determined by the user equipment by using a reverse synchronization method. That is, the user equipment detects a way in which data streams are transmitted by using the LTE and UMTS in the downlink direction, and determines, according to the detected way, a way in which data streams are transmitted by using the LTE and the UMTS in the uplink direction. Finally, the user equipment transmits the uplink data streams from a corresponding LTE or UMTS radio network to the packet core network in the determined way in which data streams are transmitted in the uplink direction.

(4) Switch between the network aggregation transmission state and the single network transmission state.

When the user equipment switches from the LTE (or UMTS) network transmission state to the network aggregation transmission state, the user equipment may directly initiate an attach procedure to the UMTS (or LTE) network. When the PDN gateway receives an attach request from the UMTS (or LTE) network, it establishes a UMTS (or LTE) bearer with the user equipment.

Figure 8:
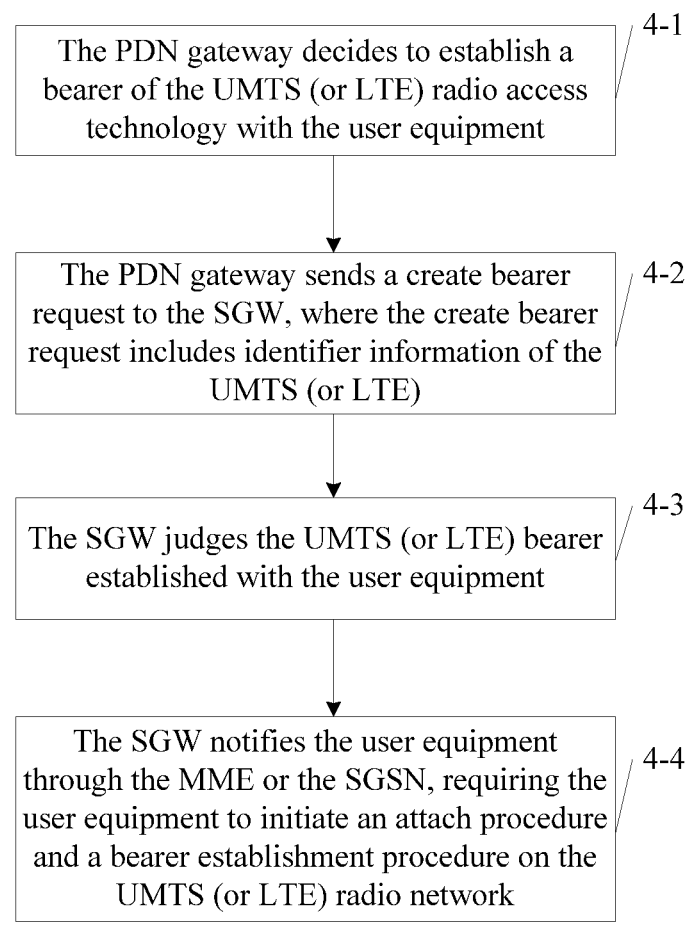
FIG. 8 is a flowchart of switching a current LTE (or UMTS) network transmission state to a network aggregation transmission state according to an embodiment of the present invention.

As shown in FIG. 8, the user equipment may also switch from a current LTE (or UMTS) network transmission state to a network aggregation transmission state by using the following steps:

Step 4-1: When the PDN gateway detects that the load of the UMTS (or LTE) network where the user equipment is located is within a preset range or other causes, the PDN gateway decides to establish a bearer of the UMTS (or LTE) radio access technology with the user equipment.

Step 4-2: The PDN gateway sends a create bearer request to the S-GW, and carries the identifier information of the UMTS (or LTE) in the create bearer request. Specifically, the PDN gateway may add an information element "Type of radio access technology" to the create bearer request, and add the identifier information of the UMTS (or LTE) to the newly added information element.

Step 4-3: The S-GW judges, according to the newly added information in the create bearer request, a bearer of which radio access technology is established. In this embodiment, the S-GW determines that a bearer of the UMTS (or LTE) radio access technology is established with the user equipment.

Step 4-4: The S-GW forwards the create bearer request to an MME or an SGSN; the MME or the SGSN notifies the user equipment of the fact that the user equipment is required to initiate an attach procedure and a bearer establishment procedure to the UMTS (or LTE) radio network.

When the user equipment switches from the network aggregation transmission state to the LTE (or UMTS) network transmission state, the user equipment may directly initiate a detach procedure to the UMTS (or LTE) radio network. When the PDN gateway receives a detach request from the UMTS (or LTE) radio network, it deletes the bearer of the UMTS (or LTE) with the user equipment.

Or, when the PDN gateway detects that the load of the UMTS (or LTE) radio network is too heavy, it sends a Delete Bearer Request that carries the identifier information of the UMTS (or LTE) to the S-GW. In this case, the S-GW, according to the identifier information of the UMTS (or LTE), notifies the user equipment through the MME or the SGSN of the fact that the user equipment is required to initiate a detach procedure to the UMTS (or LTE) radio network.

The method for radio network aggregation transmission in the case that the SGSN of the UMTS system does not support the S3/S4 interface is similar to the method for radio network aggregation transmission in the case that the SGSN of the UMTS system supports the S3/S4 interface and is not further described.

Figure 9:
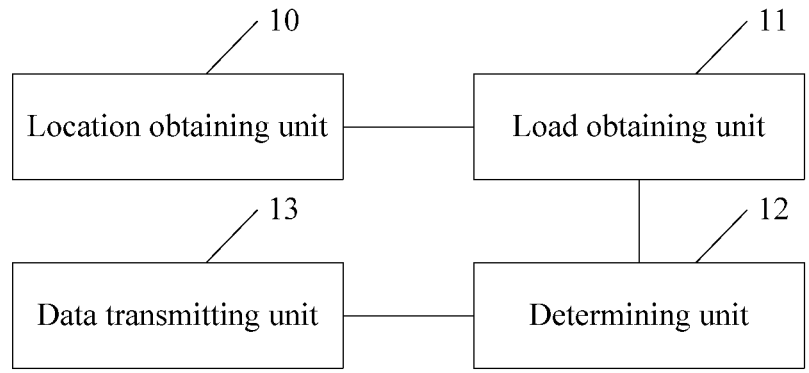
FIG. 9 is a schematic structural diagram of a gateway device according to an embodiment of the present invention.

An embodiment of the present invention provides a gateway device. The gateway device provided in this embodiment may be a PDN gateway and a schematic structural diagram thereof is shown in FIG. 9. The gateway device includes: a location obtaining unit 10, a load obtaining unit 11, a determining unit 12, and a data transmitting unit 13.

The location obtaining unit 10 is configured to obtain location information of a user equipment on at least two radio networks.

The location information can indicate a current location of the user equipment on a radio network, and the location information may be identifier information of a current cell of the user equipment, identifier information of a routing area where the user equipment is located, or identifier information of a tracking area where the user equipment is located, and so on.

The load obtaining unit 11 is configured to obtain, according to the location information obtained by the location obtaining unit 10, network load information of each radio network where the user equipment is currently located.

The determining unit 12 is configured to determine, according to the network load information obtained by the load obtaining unit 11 and a preset policy, a way in which data streams of the user equipment are transmitted by using the at least two radio access technologies.

The preset policy is the same as that described in Embodiment 1 and is not further described.

It is understandable that the determining unit 12 may consider only the actual load on a network to determine a way in which data streams are transmitted by using a radio access technology. In this way, after the data streams of the user equipment are transmitted by using a bearer of the corresponding radio access technology, requirements in the preset policy can be met, so that the load balancing is implemented between each radio network.

The determining unit 12 may consider not only the actual network load but also application layer data stream information of the user equipment, that is, other information such as data transmission based requirements of the user equipment, to determine a way in which data streams are transmitted by using a radio access technology. In this way, after data streams of the user equipment are transmitted by using a bearer of a corresponding radio access technology, not only the requirements in the preset policy but also the actual requirements of the user equipment can be met. In this way, load balancing between each radio network can be implemented, and quality of service requirements of the user equipment can be met.

The way in which the data streams of the user equipment are transmitted by using at least two radio access technologies that is determined by the determining unit 12 may include: which radio access technology and which bearer of the radio access technology are used to transmit each uplink data stream and each downlink data stream of the user equipment.

The data transmitting unit 13 is configured to transmit the data streams of the user equipment according to the way determined by the determining unit 12.

The data transmitting unit 13 may configure, in the determined way in which data streams are transmitted by using the bearers of each radio access technology, that is, which radio access technology and which bearer of the radio access technology are used to transmit each uplink data stream and/or each downlink data stream of the user equipment, bearers of each radio access technology in the uplink and/or downlink direction for the user equipment. In this way, in the downlink direction, the PDN gateway transmits the downlink data streams of the user equipment according to a configured bearer of a radio access technology in the downlink direction; in the uplink direction, the user equipment transmits the uplink data streams of the user equipment according to the configured bearer of the radio access technology in the uplink direction.

As shown above, in the gateway device provided in this embodiment of the present invention, the load obtaining unit 11 obtains, according to the location information of the user equipment on at least two radio networks that is obtained by the location obtaining unit, network load information of each radio network where the user equipment is currently located; the determining unit 12 determines, according to the network load information and a preset policy, a way in which data streams of the user equipment are transmitted by using the at least two radio access technologies; and finally the data transmitting unit 13 transmits the data streams of the user equipment in the determined way. In this way, the data volume transmitted by using each radio access technology is allocated dynamically on an aggregated network according to the actual load conditions of the network, so that the resources of each radio network on the aggregated network are effectively utilized.

Figure 10:
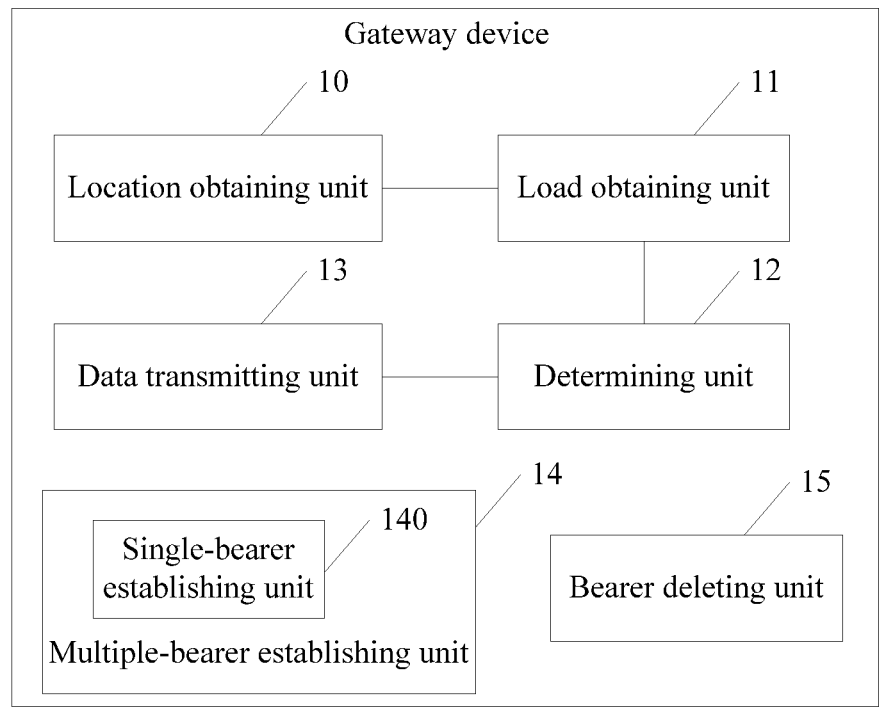
FIG. 10 is a schematic structural diagram of another gateway device according to an embodiment of the present invention.

As shown in FIG. 10, in a specific embodiment, the gateway device may further include a multiple-bearer establishing unit 14 and a bearer deleting unit 15.

The multiple-bearer establishing unit 14 is configured to establish bearers of at least two radio access technologies with the user equipment, and store identifier information of the user equipment and identifier information of the bearers of the at least two radio access technologies.

The multiple-bearer establishing unit 14 may establish bearers by using any one or multiple of the following ways: the user equipment establishes one PDN connection of bearers of multiple radio access technologies through the PDN gateway, that is, the user equipment establishes, through the PDN gateway, one PDN connection that adopts bearers of multiple radio access technologies; the user equipment establishes bearers of different radio access technologies with multiple PDN connections, that is, one part of the PDN connections established by the user equipment through the PDN gateway adopt the bearers of one radio access technology, while the other part of the PDN connections established by the user equipment through the PDN gateway adopt the bearers of another radio access technology.

The bearer deleting unit 15 is configured to delete a bearer of any one radio network where the user equipment is located if a detach request of the user equipment on any one radio network is received or if it is detected that the network load of any one radio network where the user equipment is located exceeds a preset range.

The multiple-bearer establishing unit 14 may include a single-bearer establishing unit 140 configured to establish a bearer of a second radio network with the user equipment if an attach request of the user equipment on the second radio network is received or if it is detected that the network load of the second radio network is within a preset range, where the second radio network is a radio network other than a first radio network where the user equipment is currently located.

In this embodiment, the single-bearer establishing unit 140 of the multiple-bearer establishing unit 14 establishes the bearer of the second radio access technology with the user equipment, so that the user equipment may be switched from the single network transmission state to the network aggregation transmission state; the bearer deleting unit 15 deletes the bearer of any one radio network where the user equipment is located, and switches the user equipment from the network aggregation transmission state to the single network transmission state.

Figure 11:
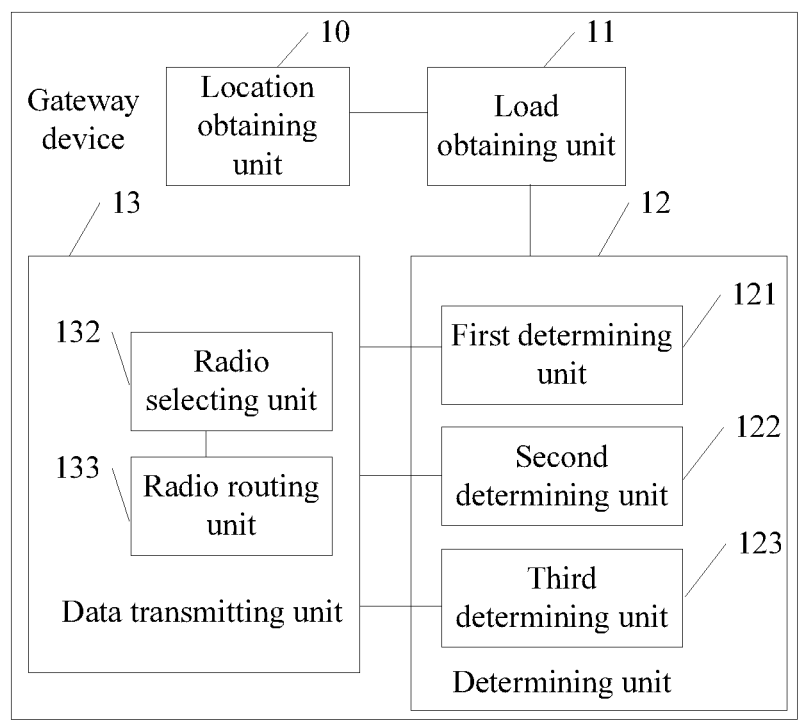
FIG. 11 is a schematic structural diagram of another gateway device according to an embodiment of the present invention.

As shown in FIG. 11, in another embodiment, the determining unit 12 may specifically include a first determining unit 121, a second determining unit 122, and a third determining unit 123, while the data transmitting unit 13 may include a radio selecting unit 132 and a radio routing unit 133.

The first determining unit 121 is configured to determine a TFT and a radio access technology that correspond to a bearer used to transmit data streams of the user equipment in the uplink direction and/or the downlink direction.

The second determining unit 122 is configured to determine, according to the network load information, service layer data stream information of the user equipment, and a preset policy, a TFT and a radio access technology that correspond to a bearer used to transmit the data streams of the user equipment in the uplink direction and/or the downlink direction.

In this embodiment, the first determining unit 121 and the second determining unit 122 control the data streams in a semi-static way, and a bearer of a same radio access technology should be used to transmit a same data stream, that is, an uplink or downlink data stream of a same TCP connection. This prevents TCP performance loss caused by great differences between transmission delays when a same data stream is transmitted by using different radio access technologies. Each data stream corresponds to a TFT.

After the first determining unit 121 and the second determining unit 122 in the gateway device determine, in semi-static allocation way, the way in which uplink and/or downlink data streams are transmitted, the data transmitting unit 13 configures bearers of each radio access technology in the uplink and downlink directions according to the way determined by the determining unit 12, and transmits data streams in the uplink and downlink directions according to the configured bearers.

The third determining unit 123 is configured to determine a data volume or a data volume proportion of the data streams of the user equipment that are transmitted by using the at least two radio access technologies in the downlink direction.

The radio selecting unit 132 is configured to select, according to the data volume or data volume proportion determined by the third determining unit 123 of the determining unit 12, a radio access technology that is used to transmit the data streams of the user equipment in the downlink direction.

The radio routing unit 133 is configured to transmit the data streams of the user equipment in the downlink direction by using a bearer of the radio access technology selected by the radio selecting unit 132.

In this embodiment, the gateway device controls data streams in a dynamic way. The third determining unit 123 of the determining unit 12 determines, in a dynamic way, the data volume or data volume proportion of streams transmitted by using each radio access technology in the downlink direction; the radio selecting unit 132 selects, according to the data volume or data volume proportion determined by the third determining unit 123, a radio access technology that is used to transmit downlink data streams, and the radio routing unit 133 transmits downlink data by using the selected radio access technology.

Because bearers of different radio access technologies in a dynamic way may use a same TFT, the following may be configured: a same TFT correspond to the bearers of multiple different radio access technologies, so that the bearers can carry data streams with the same QoS requirements. This prevents TCP performance loss caused by great differences between transmission delays when bearers of different radio access technologies are used to transmit a same data stream, that is, an uplink or downlink data stream of a same TCP connection.

Figure 12:
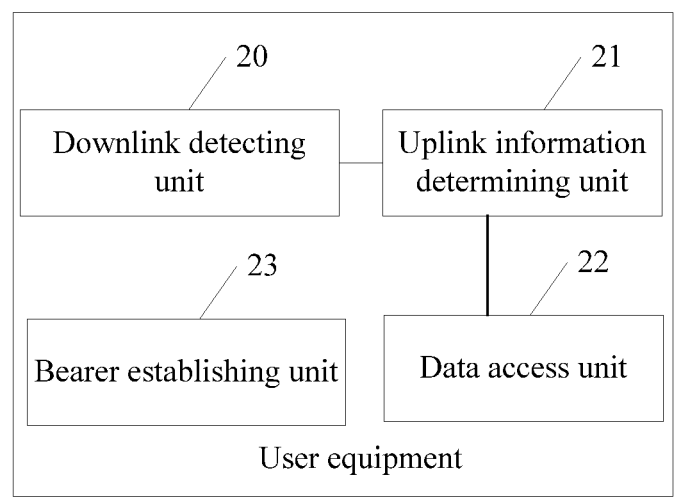
FIG. 12 is a schematic structural diagram of a user equipment according to an embodiment of the present invention.

An embodiment of the present invention provides a user equipment. As shown in FIG. 12, the user equipment includes: a downlink detecting unit 20, an uplink information determining unit 21, and a data access unit 22.

The downlink detecting unit 20 is configured to detect a way in which data streams of the user equipment are transmitted by using at least two radio access technologies in the downlink direction, where the way in which the data streams of the user equipment are transmitted by using the at least two radio access technologies in the downlink direction is determined by a PDN gateway according to network load information of at least two radio networks where the user equipment is currently located.

The uplink information determining unit 21 is configured to determine, according to the way detected by the downlink detecting unit 20, a way in which data streams of the user equipment are transmitted by using the at least two radio access technologies in the uplink direction.

When the uplink information determining unit 21 determines the way in which data streams are transmitted in the uplink direction, it may determine, according to a data volume proportion carried by using at least two radio access technologies in the downlink direction or according to a preset calculation relationship, a way in which data streams of the user equipment are transmitted in the uplink direction. For example, the data volume proportion carried by using at least two radio access technologies in the downlink direction is used as the data volume proportion carried by using at least two radio access technologies in the uplink direction; or the data volume proportion carried by using at least two radio access technologies in the uplink direction is equal to the data volume proportion carried by using a radio access technology in the downlink direction multiplied by a scaling factor, where the scaling factor may be configured inside the user equipment or dynamically configured by the network side through signaling.

The data access unit 22 is configured to transmit uplink data streams of the user equipment from a corresponding radio network to a packet core network according to the way determined by the uplink information determining unit 21.

As known above, in the user equipment provided in this embodiment, the uplink information determining unit 21 determines, according to the way in which data streams are transmitted by using at least two radio access technologies in the downlink direction detected by the downlink detecting unit 20, a way in which data streams are transmitted by the user equipment by using at least two radio access technologies in the uplink direction, and the data access unit 22 transmits the data streams from a corresponding radio network to the packet core network. Because the information of data streams of the user equipment in the downlink direction is determined dynamically according to the actual load conditions of the network, resources of each radio network on the aggregated network are effectively utilized.

In a specific embodiment, the user equipment further includes a bearer establishing unit 23 configured to establish bearers of at least two radio access technologies through the PDN gateway.

When the bearer establishing unit 23 establishes a bearer with the PDN gateway, it may use any one or multiple of the following ways: One PDN connection that the bearer establishing unit 23 establishes through the PDN gateway adopts bearers of multiple radio access technologies; the bearer establishing unit 23 establishes bearers of different radio access technologies with multiple PDNs, that is, one part of the PDN connections that the bearer establishing unit 23 establishes through the PDN gateway adopt the bearers of one radio access technology, while the other part of the PDN connections that the bearer establishing unit 23 establishes through the PDN gateway adopt the bearers of another radio access technology.

In this embodiment, the bearer establishing unit 23 establishes bearers of multiple radio access technologies of a same PDN connection through the PDN gateway and by using a same PDN address, that is, an IP address. In this way, waste of address resources is prevented. In addition, the bearer establishing unit 23 establishes bearers of different radio access technologies corresponding to different PDN connections through the PDN gateway and by using different IP addresses, while the PDN gateway can know, according to the identifier information of the user equipment, bearers of which radio access technologies are established by the user equipment.

An embodiment of the present invention provides a system for radio network aggregation, where multiple radio networks have a uniform packet core network. The system includes a user equipment and a PDN gateway device, where the user equipment is the same as that shown in FIG. 12.

The PDN gateway device is configured to determine, according to network load information of at least two radio networks where the user equipment is currently located, a way in which data streams of the user equipment are transmitted by using at least two radio access technologies in a downlink direction.

All units in the user equipment and the gateway device provided in this embodiment of the present invention can perform network aggregation transmission according to the methods provided in Embodiment 1 and Embodiment 2, and details are not described herein.

In conclusion, by using the method, system, and device for radio network aggregation in embodiments of the present invention, the PDN gateway obtains, according to the location information of the user equipment on at least two radio networks, network load information of each radio network where the user equipment is currently located, and determines, according to the network load information and a preset policy, a way in which data streams of the user equipment are transmitted by using the at least two radio access technologies, and finally transmits the data streams of the user equipment in the determined way. In this way, the data volume of streams transmitted by using each radio access technology is allocated properly on an aggregated network according to the actual load conditions of the network, so that the resources of each radio network on the aggregated network are effectively utilized.

It is understandable to persons of ordinary skill in the art that all or a part of the steps in the methods according to the preceding embodiments may be performed by hardware instructed by a program. The program may be stored in a computer readable storage medium, such as a read-only memory (ROM), a random-access memory (RAM), a magnetic disk, and a compact disc read-only memory (CD-ROM).

Detailed above are a method, system, and device for radio network aggregation according to the embodiments of the present invention. Although the invention is described through some exemplary embodiments, the invention is not limited to such embodiments. It is apparent that persons of ordinary skill in the art can make various modifications and variations to the invention without departing from the spirit and scope of the invention. The invention shall cover the modifications and variations provided that they fall in the scope of protection defined by the following claims or equivalents thereof.

What is claimed is:

1. A method for radio network aggregation transmission comprising:
   obtaining location information of a user equipment on at least two radio networks;
   obtaining, according to the location information, network load information of each radio network where the user equipment is currently located;
   determining, according to the network load information and a preset policy, a way in which data streams of the user equipment are transmitted by using at least two radio access technologies; and
   transmitting the data streams of the user equipment in the determined way,
   wherein determining, according to the network load information and the preset policy, the way in which data streams of the user equipment are transmitted by using the at least two radio access technologies comprises:
      determining a traffic flow template (TFT) and a radio access technology that correspond to a bearer used to transmit the data streams of the user equipment in an uplink direction, a downlink direction, or both; or
      determining, according to the network load information, service layer data stream information of the user equipment, and the preset policy, a TFT and a radio access technology that correspond to a bearer used to transmit the data streams of the user equipment in the uplink direction, the downlink direction, or both.

2. The method according to claim 1, wherein before obtaining location information of the user equipment on the at least two radio networks, the method further comprises:
   establishing bearers of at least two radio access technologies with the user equipment; and storing identifier information of the user equipment and identifier information of the bearers of the at least two radio access technologies.

3. The method according to claim 2, wherein establishing the bearers of the at least two radio access technologies with the user equipment comprises establishing a bearer of a second radio access technology with the user equipment when an attach request of the user equipment on a second radio network is received, when it is detected that a network load of the second radio network in within a preset range, or both, and wherein the second radio network is a radio network other than a first radio network where the user equipment is currently located.

4. The method according to claim 3, wherein the at least two radio networks comprise a Universal Mobile Telecommunications System (UMTS) network and a Long Term Evolution (LTE) network, and wherein establishing the bearer of the second radio access technology with the user equipment comprises:
sending, by a Packet Data Network (PDN) gateway, a create bearer request to a Serving Gateway (S-GW), wherein the create bearer request comprises identifier information of the second radio access technology; and
notifying, by the S-GW according to the identifier information of the second radio access technology, the user equipment through a Mobility Management Entity (MME) or a Serving General Packet Radio Service Support Node (SGSN) such that the user equipment initiates an attach procedure and a bearer establishment procedure on the second radio network.

5. The method according to claim 1, further comprising deleting a bearer of the user equipment on a radio network when a detach request of the user equipment on the radio network is received, when it is detected that a network load of the radio network where the user equipment is located exceeds a preset range, or both.

6. The method according to claim 5, wherein the at least two radio networks comprise a UMTS network and an LTE network, and wherein deleting the bearer of the user equipment on the radio network comprises:
sending, by a PDN gateway, a Delete Bearer Request to an S-GW, wherein the Delete Bearer Request comprises identifier information of a radio access technology; and
notifying, by the S-GW according to the identifier information of the radio access technology, the user equipment through an MME or an SGSN such that the user equipment initiates a detach procedure on the radio network.

7. A method for radio network aggregation transmission comprising:
obtaining location information of a user equipment on at least two radio networks;
obtaining, according to the location information, network load information of each radio network where the user equipment is currently located;
determining, according to the network load information and a preset policy, a way in which data streams of the user equipment are transmitted by using at least two radio access technologies; and
transmitting the data streams of the user equipment in the determined way,
wherein determining, according to the network load information and the preset policy, the way in which the data streams of the user equipment are transmitted by using the at least two radio access technologies comprises determining a data volume or a data volume proportion of the data streams of the user equipment that are transmitted by using the at least two radio access technologies in a downlink direction,
wherein transmitting the data streams of the user equipment in the determined way comprises selecting, according to the determined data volume or the determined data volume proportion, a radio access technology that is used to transmit the data streams of the user equipment in the downlink direction, and
wherein transmitting the data streams of the user equipment in the downlink direction by using a bearer of the selected radio access technology.

8. A gateway device comprising:
a processor, wherein the processor is configured to:
obtain location information of a user equipment on at least two radio networks;
obtain, according to the location information, network load information of each radio network where the user equipment is currently located;
determine, according to the network load information and a preset policy, a way in which data streams of the user equipment are transmitted by using at least two radio access technologies;
transmit the data streams of the user equipment according to the determined way;
determine a data volume or a data volume proportion of data streams of the user equipment that are transmitted by using the at least two radio access technologies in a downlink direction;
select, according to the determined data volume or the determined data volume proportion, a radio access technology that is used to transmit the data streams of the user equipment in the downlink direction; and
transmit the data streams of the user equipment in the downlink direction by using a bearer of the radio access technology.

9. The gateway device according to claim 8, wherein the processor is further configured to establish bearers of the at least two radio access technologies with the user equipment and store identifier information of the user equipment and identifier information of the bearers of the at least two radio access technologies.

10. The gateway device according to claim 9, wherein the processor is further configured to establish a bearer of a second radio network with the user equipment when an attach request of the user equipment on the second radio network is received, when it is detected that a network load of the second radio network is within a preset range, or both, and wherein the second radio network is a radio network other than a first radio network where the user equipment is currently located.

11. The gateway device according to claim 8, wherein the processor is further configured to delete a bearer on a radio network where the user equipment is located when a detach request of the user equipment on the radio network is received, when it is detected that a network load of the radio network where the user equipment is located exceeds a preset range, or both.

12. A gateway device comprising:
a processor, wherein the processor is configured to:
obtain location information of a user equipment on at least two radio networks;
obtain, according to the location information, network load information of each radio network where the user equipment is currently located;

determine, according to the network load information and a preset policy, a way in which data streams of the user equipment are transmitted by using at least two radio access technologies;

transmit the data streams of the user equipment according to the determined way;

determine a traffic flow template (TFT) and a radio access technology that correspond to a bearer used to transmit the data streams of the user equipment in an uplink direction, a downlink direction, or both; and determine, according to the network load information, service layer data stream information of the user equipment, and the preset policy, a TFT and a radio access technology that correspond to a bearer used to transmit the data streams of the user equipment in the uplink direction, the downlink direction, or both.

13. A method for radio network aggregation transmission comprising:

obtaining location information of a user equipment on at least two radio networks;

obtaining, according to the location information, network load information of each radio network where the user equipment is currently located;

determining, according to the network load information and a preset policy, a way in which data streams of the user equipment are transmitted by using at least two radio access technologies;

transmitting the data streams of the user equipment in the determined way, wherein before obtaining location information of the user equipment on the at least two radio networks, the method further comprises:

establishing bearers of at least two radio access technologies with the user equipment; and storing identifier information of the user equipment and identifier information of the bearers of the at least two radio access technologies, wherein establishing the bearers of the at least two radio access technologies with the user equipment comprises establishing a bearer of a second radio access technology with the user equipment when an attach request of the user equipment on a second radio network is received, when it is detected that a network load of the second radio network in within a preset range, or both, and wherein the second radio network is a radio network other than a first radio network where the user equipment is currently located, wherein the at least two radio networks comprise a Universal Mobile Telecommunications System (UMTS) network and a Long Term Evolution (LTE) network, and wherein establishing the bearer of the second radio access technology with the user equipment comprises:

sending, by a Packet Data Network (PDN) gateway, a create bearer request to a Serving Gateway (S-GW), wherein the create bearer request comprises identifier information of the second radio access technology; and notifying, by the S-GW according to the identifier information of the second radio access technology, the user equipment through a Mobility Management Entity (MME) or a Serving General Packet Radio Service Support Node (SGSN) such that the user equipment initiates an attach procedure and a bearer establishment procedure on the second radio network.

14. A method for radio network aggregation transmission comprising:

obtaining location information of a user equipment on at least two radio networks;

obtaining, according to the location information, network load information of each radio network where the user equipment is currently located;

determining, according to the network load information and a preset policy, a way in which data streams of the user equipment are transmitted by using at least two radio access technologies;

transmitting the data streams of the user equipment in the determined way;

deleting a bearer of the user equipment on a radio network when a detach request of the user equipment on the radio network is received, when it is detected that a network load of the radio network where the user equipment is located exceeds a preset range, or both, wherein the at least two radio networks comprise a Universal Mobile Telecommunications System (UMTS) network and a Long Term Evolution (LTE) network, and wherein deleting the bearer of the user equipment on the radio network comprises:

sending, by a Packet Data Network (PDN) gateway, a Delete Bearer Request to a Serving Gateway (S-GW), wherein the Delete Bearer Request comprises identifier information of a radio access technology; and notifying, by the S-GW according to the identifier information of the radio access technology, the user equipment through a Mobility Management Entity (MME) or a Serving General Packet Radio Service Support Node (SGSN) such that the user equipment initiates a detach procedure on the radio network.

* * * * *